United States Patent
Wong et al.

(10) Patent No.: US 12,393,673 B2
(45) Date of Patent: *Aug. 19, 2025

(54) DIGITAL INSTANT ISSUANCE WITH INSTANT PROCESSING

(71) Applicant: VISA INTERNATIONAL SERVICE ASSOCIATION, San Francisco, CA (US)

(72) Inventors: Shoon Ping Wong, Centennial, CO (US); Justin Monk, Higlands Ranch, CO (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,896

(22) Filed: Dec. 13, 2023

(65) Prior Publication Data

US 2024/0126867 A1  Apr. 18, 2024

Related U.S. Application Data

(63) Continuation of application No. 17/411,026, filed on Aug. 24, 2021, now Pat. No. 11,886,571, which is a
(Continued)

(51) Int. Cl.
*G06F 21/45* (2013.01)
*G06Q 20/40* (2012.01)
*H04L 9/40* (2022.01)

(52) U.S. Cl.
CPC .............. *G06F 21/45* (2013.01); *G06Q 20/40* (2013.01); *H04L 63/08* (2013.01); *G06F 2221/2115* (2013.01); *G06F 2221/2137* (2013.01)

(58) Field of Classification Search
None
See application file for complete search history.

(56) References Cited

U.S. PATENT DOCUMENTS 6,327,578 B1  12/2001  Linehan
8,693,655 B1 * 4/2014  Chau .................... H04M 17/10
                                                     379/201.11
(Continued)

FOREIGN PATENT DOCUMENTS

CA   3000493 A1   10/2019
CN   105934771    9/2016
(Continued)

OTHER PUBLICATIONS

"English Translation of CN 108833507 A", Nov. 16, 2018.
(Continued)

*Primary Examiner* — Venkat Perungavoor
(74) *Attorney, Agent, or Firm* — Kilpatrick Townsend & Stockton LLP

(57) ABSTRACT

An entity may generate digital account credentials when a new account is approved for generation by an authorizing entity that controls or issues new accounts. A user may contact an authorizing entity to open a new account with the authorizing entity. The authorizing entity may authenticate the user and may approve a new account to be generated for the user. The user may wish to conduct transactions immediately upon approval. However, the authorizing entity may not immediately generate a physical identification device along with an actual account identifier associated with the new account. An intermediary entity may generate digital account credentials for the new account immediately after the authorizing entity approves generation of the new
(Continued)

account, provide the digital account credentials to the account holder, and process transactions using the digital account credentials.

16 Claims, 10 Drawing Sheets

Related U.S. Application Data continuation of application No. 16/248,672, filed on Jan. 15, 2019, now Pat. No. 11,126,707.

(56) References Cited

U.S. PATENT DOCUMENTS

| | | | |
|---|---|---|---|
| 9,721,087 B1 | 8/2017 | Duchin et al. | |
| 10,002,352 B2 | 6/2018 | Bondesen et al. | |
| 10,242,362 B2 | 3/2019 | Burgess et al. | |
| 10,862,897 B2* | 12/2020 | D'Agostino | H04L 9/3234 |
| 2001/0034702 A1* | 10/2001 | Mockett | G06Q 20/023 |
| | | | 705/26.1 |
| 2002/0046169 A1* | 4/2002 | Keresman, III | G06Q 40/00 |
| | | | 705/26.1 |
| 2002/0083012 A1* | 6/2002 | Bush | G06Q 20/3821 |
| | | | 705/76 |
| 2008/0222047 A1 | 9/2008 | Boalt | |
| 2009/0063312 A1 | 3/2009 | Hurst | |
| 2009/0119205 A1* | 5/2009 | Keresman, III | G06Q 20/385 |
| | | | 705/39 |
| 2013/0103581 A1 | 4/2013 | Barry et al. | |
| 2013/0246259 A1* | 9/2013 | Dessert | G06Q 20/40 |
| | | | 705/41 |
| 2014/0019358 A1 | 1/2014 | Priebatsch | |
| 2014/0032418 A1 | 1/2014 | Weber | |
| 2014/0108263 A1 | 4/2014 | Ortiz et al. | |
| 2014/0188704 A1* | 7/2014 | Grossman | G06Q 40/02 |
| | | | 705/35 |
| 2014/0188718 A1* | 7/2014 | Grossman | G06Q 20/3227 |
| | | | 705/41 |
| 2014/0365322 A1 | 12/2014 | Phillips | |
| 2015/0254642 A1 | 9/2015 | Bondesen et al. | |
| 2015/0324799 A1 | 11/2015 | Cardina et al. | |
| 2016/0104187 A1 | 4/2016 | Tietzen et al. | |
| 2016/0125405 A1 | 5/2016 | Alterman et al. | |
| 2017/0091757 A1 | 3/2017 | Lloyd et al. | |
| 2017/0109745 A1 | 4/2017 | Al-Bedaiwi et al. | |
| 2017/0272245 A1* | 9/2017 | Norton | H04L 9/0863 |
| 2017/0316402 A1* | 11/2017 | Anantharaman | G06Q 20/409 |
| 2018/0181955 A1 | 6/2018 | Woods et al. | |
| 2018/0197171 A1 | 7/2018 | Steinman et al. | |
| 2018/0276669 A1* | 9/2018 | McIntyre | G06Q 20/407 |
| 2018/0316687 A1 | 11/2018 | Hribovsek et al. | |
| 2020/0211098 A1 | 7/2020 | Miyamoto et al. | |
| 2020/0364720 A1 | 11/2020 | Lally et al. | |

FOREIGN PATENT DOCUMENTS

| | | |
|---|---|---|
| CN | 107851254 A | 3/2018 |
| CN | 108141368 A | 6/2018 |
| CN | 108713211 A | 10/2018 |
| CN | 108833507 A | 11/2018 |
| WO | 2018200842 A1 | 11/2018 |
| WO | 2019059964 A1 | 3/2019 |

OTHER PUBLICATIONS

U.S. Appl. No. 15/295,859, Non-Final Office Action, Mailed On Mar. 27, 2019, 16 pages.
U.S. Appl. No. 16/248,672, Non-Final Office Action, Mailed On Feb. 5, 2021, 13 pages.
U.S. Appl. No. 16/248,672, Notice of Allowance, Mailed On May 21, 2021, 8 pages.
Application No. EP20151683.8, Extended European Search Report, Mailed On May 27, 2020, 8 pages.
Zhang et al., "Security Models and Requirements for Healthcare Application Clouds", Proceedings of the 2010 IEEE 3rd International Conference on Cloud Computing, Jul. 2010, 8 pages.
Application No. CN202010037608.7, Office Action, Mailed On Jun. 22, 2024, 13 pages.
Application No. CN202010037608.7, Office Action, Mailed On Nov. 21, 2024, 15 pages.
Application No. CN202010037608.7, Office Action, Mailed On Feb. 7, 2025, 16 pages.
Application No. CN202010037608.7, Office Action, Mailed On Apr. 28, 2025, 17 pages.

* cited by examiner

DIGITAL INSTANT ISSUANCE WITH INSTANT PROCESSING

CROSS REFERENCE TO RELATED APPLICATIONS

This application is a continuation application of U.S. application Ser. No. 17/411,026, filed Aug. 24, 2021, which is a continuation application and claims the benefit of the filing date of U.S. application Ser. No. 16/248,672, filed Jan. 15, 2019, now U.S. Pat. No. 11,126,707, issued Sep. 21, 2021, which is herein incorporated by reference in its entirety for all purposes.

BACKGROUND OF THE INVENTION

Conventionally, when an authorizing entity issues a new account for a user, the user does not have the ability to conduct transactions using the new account immediately upon issuance. Specifically, the user (i.e. the account holder) needs to first obtain a physical account identifying device and/or a permanent actual account identifier and confirm receipt of the physical account identifying device before being able to use the account. Once user confirms the receipt of the physical account identifying device, the authorizing entity then will mark the account as active (i.e. ready to transact). The authorizing entities currently do not immediately issue physical account identifying devices and/or permanent actual account identifiers or do not mark the account as active before user validates receipt of the physical account device upon approving new accounts. Without the user validation of the physical account device, the user cannot immediately transact.

Embodiments of the invention address these and other problems individually and collectively.

BRIEF SUMMARY OF THE INVENTION

Embodiments of the invention are directed to more effective and efficient ways to generate account credentials. Embodiments enable an entity (e.g. a digital credential issuing server computer) to immediately generate an active digital account credential and immediately available to process user transactions using the digital account credential when a new account is approved for generation by an authorizing entity that controls or issues new accounts. A user may contact an authorizing entity to open a new account with the authorizing entity. The authorizing entity may approve a new account to be issued/generated for the user. The user (now an account holder) may wish to conduct transactions (e.g. make a purchase, load credit to a transportation account, access to a database, access a physical building using an employee ID number) immediately upon approval. However, the authorizing entity may not immediately generate a physical identification device along with an actual, permanent account identifier associated with the new account, or the authorizing entity may not immediately mark the account as active (i.e. ready to transact) before the user validates or confirm receipt of the physical identification device. To allow user to immediately transact, an intermediary entity, such as a digital credential issuing server computer, will generate and activate a digital account credential for the new account immediately after the authorizing entity approves generation of the new account, provide the digital account credential to the account holder, and process transactions using the digital account credential.

Embodiments provide a method where a server computer receives information about a new account authorized for generation from an authorizing entity computer. The server computer generates a digital account credential identifying the new account and transmits the digital account credential to user device of an account holder of the new account. The server computer receives a transaction authorization request message for a transaction initiated using the digital account credential, and determines that the transaction using the digital account credential is authorized or denied. The server computer generates an authorization decision response message including determination that the transaction using the digital account credential is authorized or denied. The server computer then transmits a transaction advice message to the authorizing entity computer including the determination that the transaction using the digital account credential is authorized or denied.

In some embodiments, the digital account credential automatically expires, based on a pre-determined time period, upon activation of an actual account credential linked to a physical account identification device associated with the new account. In other embodiments, the server computer may receive, from the authorizing entity computer, notification regarding activation of an actual account credential linked to a physical account identification device associated with the new account. The server computer may then deactivate the digital account credential. In yet other embodiments, the server computer may deactivate the digital account credential after a predetermined amount of time. According to some embodiments, the server computer may limit use of the digital account credential by a predetermined criteria after a predetermined amount of time.

In some embodiments, the server computer may generate a token associated with and representing the digital account credential, wherein the token is provisioned on an electronic wallet of the account holder. The server computer may receive notification regarding activation of an actual account credential linked to a physical account identification device associated with the new account. The server computer may deactivate the digital account credential, and update the token with the actual account credential.

In some embodiments, upon receiving the transaction request message and prior to determining that the transaction is authorized or denied, the server computer may request account status information and/or account balance information associated with the new account from the authorizing entity computer, and receive the account status information and/or account balance information associated with the new account from the authorizing entity computer. The server computer may determine that the transaction using the digital account credential is authorized or denied based on the account status information and/or the account balance information received from the authorizing entity computer.

In some embodiments, the information about the new account includes one or more restrictions associated with the new account. The server computer determines that the transaction using the digital account credential is authorized or denied based on the one or more restrictions associated with the new account.

In some embodiments, the server computer may transmit the authorization decision response message to a transaction processing server. The transaction processing server may be configured to generate a transaction authorization response message including determination that the transaction using the digital account credential is authorized or denied, and transmit the transaction authorization response message to a resource provider. The account holder conducts the transaction with the resource provider.

Another embodiment of the invention is directed to a computer programmed to perform the above-noted method.

Further details regarding embodiments of the invention can be found in the Detailed Description and the Figures.

DETAILED DESCRIPTION OF THE INVENTION

Figure 1:
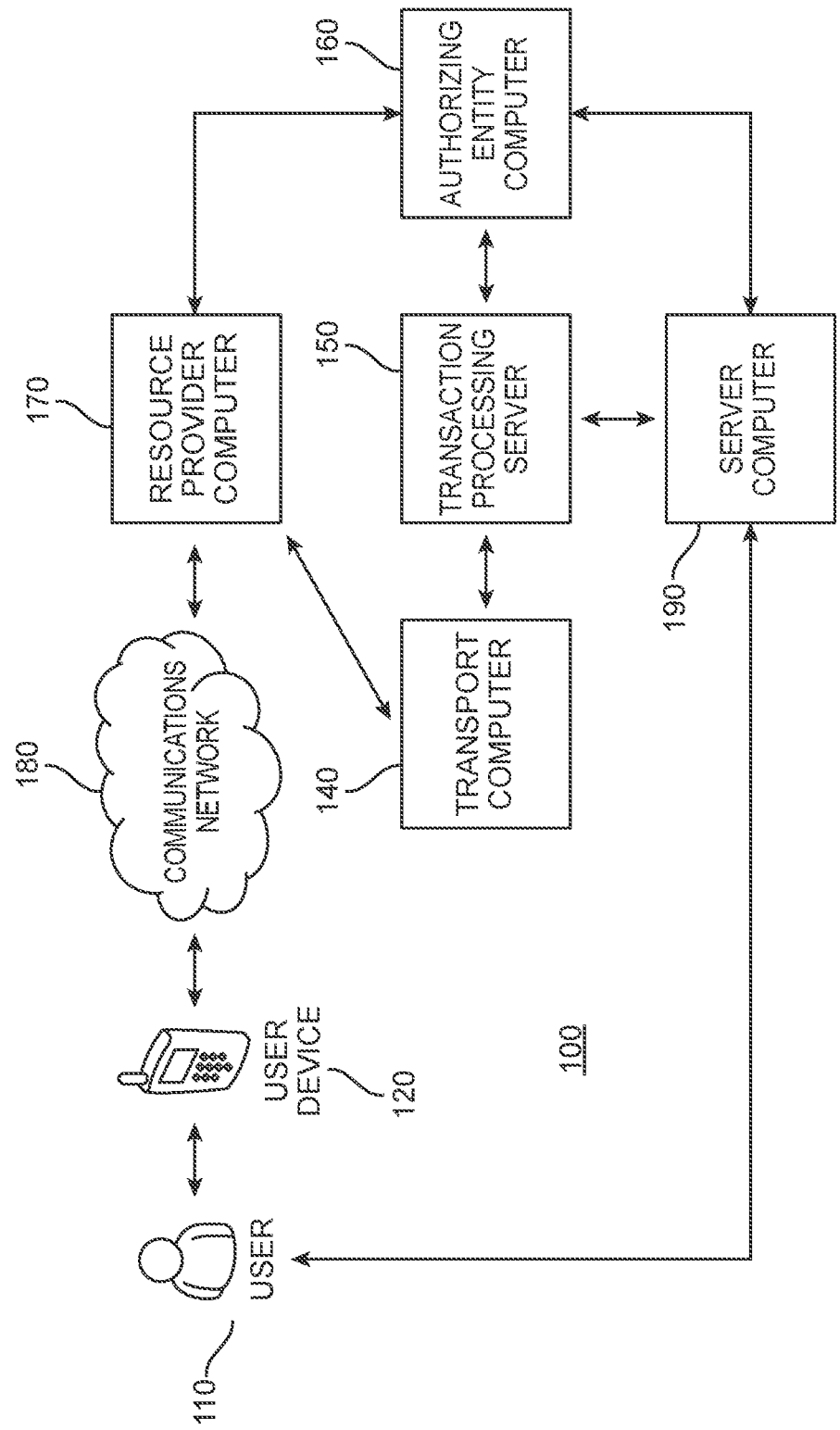
FIG. 1 shows a block diagram of a system according to an embodiment of the invention. The system can be used to generate and activate, by a server computer, digital account credential(s) immediately upon approval of a new account for generation by an authorizing entity computer.

Embodiments enable an entity (e.g. a digital credential issuing server computer) to generate digital account credential (e.g. a digital account identifier) when a new account is approved by an authorizing entity that controls or issues new accounts. A user may contact the authorizing entity to open a new account with the authorizing entity. The account may be a transaction account (e.g. a financial account, a transportation system account), an employment account, an access account (e.g. a digital access account such as a database access account), etc. The authorizing entity may authenticate the user upon receiving identification and verification data from the user, and may approve a new account to be generated for the user. The user (now an account holder) may wish to conduct transactions (e.g. make a purchase, load credit to a transportation account, access to a database) immediately upon approval. However, the authorizing entity may not immediately generate a physical identification device along with an actual, permanent account identifier associated with the new account. An intermediary entity, such as a digital credential issuing server computer, may generate a temporary digital account credential (e.g. a digital account identifier, a verification value, etc.) for the new account immediately after the authorizing entity approves generation of the new account, provide the digital account credential to the account holder, validates the account holder and process transactions using the digital account credential.

According to various embodiments, the digital account credential may be valid only for a predetermined amount of time (i.e. until the user (account holder) activates the physical identification device and/or the actual account identifier associated with the new account). The digital account credential may be automatically deactivated upon activation of the physical identification device and/or the actual (i.e. permanent) account identifier. Accordingly, the intermediary entity may only process transactions using the new account (initiated using the digital account credential) for the period starting from the authorizing entity approving the new account for generation until the user activates the physical identification device and/or the actual account identifier associated with the new account.

Embodiments allow the user to transact immediately and digitally when the account application has been approved instead of the user waiting to receive the physical account identification device (e.g. an identification card, a credit card, a debit card, etc.) before being able to transact using the new account.

Prior to discussing specific embodiments of the invention, some terms may be described in detail.

A "user device" may comprise any suitable electronic device that may have remote communication capabilities. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may be any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a user device can function as a payment device (e.g., a user device can store and be able to transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation of a fact in question. Examples of credentials include value credentials, identification cards, certified documents, access cards, passcodes and other login information, payment credentials, etc.

"Payment credentials" may include any suitable information associated with an account (e.g., a payment account and/or payment device associated with the account). Such information may be directly related to the account or may be derived from information related to the account. Examples of account information may include a PAN (primary account number or "account number"), a payment token, a user name, expiration date, CVV (card verification value), dCVV (dynamic card verification value), CVV2 (card verification value 2), dCVV2 (dynamic card verification value 2), CVC3 card verification values, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," "token provider" or "token service system" can include a system that services tokens. In some embodiments, a token service system can facilitate requesting, determining (e.g., generating) and/or issuing tokens, as well as maintaining an established mapping of tokens to primary account numbers (PANs) in a repository (e.g., token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual PANs. In some embodiments, a token service system may include a tokenization computer alone, or in combination with other computers such as a transaction processing network computer (referred also as a transaction processing server). Various entities of a tokenization ecosystem may assume the roles of the token service provider. For example, payment networks and issuers or their agents may become the token service provider by implementing the token services according to embodiments of the present invention.

An "application" may be computer code or other data stored on a computer readable medium (e.g. memory element or secure element) that may be executable by a processor to complete a task.

A "user" may include an individual. In some embodiments, a user may be associated with one or more personal accounts and/or mobile devices. The user may also be referred to as a cardholder, account holder, or consumer.

A "resource provider" may be an entity that can provide resources such as goods, services, information, and/or access. Examples of resource providers include merchants, data providers, governmental agencies, transit agencies, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may include an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a system 100 comprising a number of components for issuing digital account credentials and processing transactions using digital account credentials. The system 100 comprises a user device 120, which may be associated with a user (e.g. account holder) 110. The user device 120 may be in communication with an authorizing entity computer 160 via a communications network 180.

The system 100 may also include a resource provider computer 170, a transport computer 140, a transaction processing computer 150, and a server computer (e.g. digital credential issuing server computer) 190. The user device 120, the authorizing entity computer 160, the transport computer 140, the resource provider computer 170, the transaction processing computer 150 and/or the server computer 190 may all be in operative communication with each other through any suitable communication channel or communications network.

Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure HyperText Transfer Protocol (HTTPS), Secure Socket Layer (SSL), ISO (e.g., ISO 8583) and/or the like.

The user 110 may use the user device 120 to contact the authorizing entity computer 160 via the communications network 180 to obtain/open a new account with the authorizing entity computer 160. In some embodiments, the user 110 may contact the authorizing entity computer 160 in person to obtain the new account. The authorizing entity computer 160 may authenticate the user 110 upon receiving authentication information from the user 110. Upon authentication, the authorizing entity computer 160 may authorize the new account to be generated for the user 110. However, the authorizing entity computer 160 may not be able to issue a permanent, actual account credential and/or a physical account identification device to the user 110 right away.

According to the embodiments, the authorizing entity computer 160 may contact the server computer 190 and notify the server computer 190 of the new account being approved for generation for the user 110. The server computer 190 may generate a digital account credential for the new account, and may transmit the digital account credential for the new account to the user 110 or to the user device 120 of the user 110. In some embodiments, the server computer 190 may receive a request to verify that the user device is associated with the truthful account holder of the new account prior to transmitting the digital account credentials or prior to approving transactions performed with the user device. The user 110 may conduct transactions using the new account by presenting the digital account credential to the resource providers.

According to various embodiments, the user 110 may use the user device 120 to conduct transactions with a resource provider associated with the resource provider computer 170. For example, the user 110 may present the digital account credential provided by the server computer 190. Accordingly, the user 110 may use the newly generated account to conduct an immediate transaction with the resource provider 170 upon generation of the new account. Authorization request messages for the transactions initiated using the digital account credential submitted by the resource provider computer 170 may be sent to the transport computer 140 (which may be an acquirer computer associated with an acquirer). The transport computer 140 may be associated with the resource provider computer 170, and may manage authorization requests and manage an account on behalf of the resource provider associated with the resource provider computer 170.

As shown in FIG. 1, the transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing network may include VisaNet™ or VISA Micro Processing Server (VMS). Transaction processing networks such as VisaNet™ or VMS are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 150 may use any suitable wired or wireless network, including the Internet.

When the transaction processing computer 150 receives an authorization request for a transaction initiated using the digital account credential, the transaction processing computer 150 may transmit the request to the server processor 190 for processing. According to various embodiments, the transaction processing computer 150 may identify the transaction as being initiated with the digital account credential based on a predetermined format of the digital account credential, as explained below.

Prior to the authorizing entity computer 160 generating the actual account credential and/or the physical account identification device associated with the newly generated account, the server computer 190 may determine whether transactions initiated using the digital account credential (issued by the server computer 190) are authorized or declined. According to some embodiments, before authorizing a transaction, the server computer 190 may request status information for the new account from the authorizing entity computer 160. In other embodiments, the server computer 190 may authorize a transaction without communicating with the authorizing entity computer 160.

In some embodiments, the server computer 190 may also tokenize the digital account credential. That is, the server computer 190 may generate a token corresponding to the digital account credential and representing the new account. In some embodiments, the server computer 190 may interact with a token service system to generate the token and to store the correspondence between the token and the digital account credential and/or the new account. If the server computer 190 receives a transaction authorization request that includes a token, the server computer 190 may be able to de-tokenize the token in order to obtain the associated digital account credentials.

Figure 2:
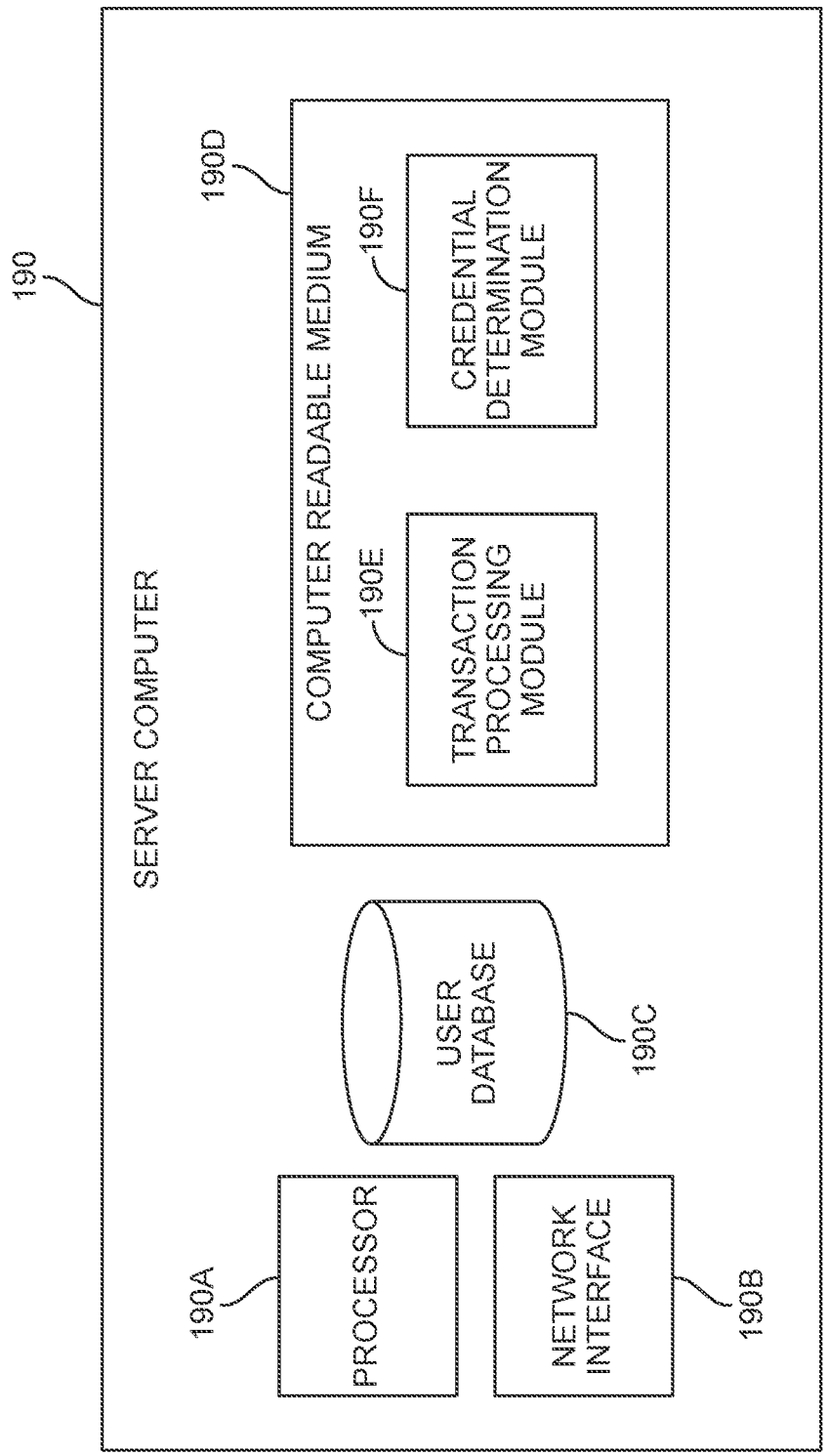
FIG. 2 shows a block diagram of a server computer according to an embodiment of the invention. The system can be used to generate digital account credential(s) immediately upon approval of a new account for generation by an authorizing entity computer.

An example of the server computer 190, according to some embodiments of the invention, is shown in FIG. 2. The server computer 190 comprises a processor 190A, a network interface 190B, a credential database 190C, and a computer readable medium 190D. The computer readable medium 190D may comprise a transaction processing module 190E, a credential determination module 190F, and any other suitable software module.

The credential determination module 190F may comprise code that causes the processor 190A to determine an appropriate credential, such as the digital account credential (e.g. digital account credential (e.g. a digital account identifier, a verification value, etc.) for the new account, using any suitable algorithm. The generated digital account credential may be stored at the credential database 190C.

According to various embodiments, the credential determination module 190F may determine the digital account credential according to a predetermined criteria (e.g. a predetermined format, or a predetermined sequence of symbols including, for example, an authorizing entity identification number, a transaction processing entity identification number, etc.). The predetermined criteria or the format of the digital account credential may help the transaction processing module 190E to identify a transaction as a transaction initiated with a digital account credential and, as such, a transaction that should be processed by the transaction processing module 190E.

The transaction processing module 190E may comprise code that causes the processor 190A to process transactions initiated using the digital account identifier. For example, the transaction processing module 190E may receive a transaction authorization request message via the network interface 190B for a transaction initiated by the user 110 at the resource provide computer 170. The transaction processing module 190E may contain logic that causes the processor 190A to determine if the transaction is initiated using the digital account identifier generated by the credential determination module 190F of the transaction processing computer 190. If the transaction is initiated using the digital account credential, the transaction processing module 190E may contain logic that causes the processor 190A to determine whether the transaction should be approved or declined, during the period after the new account has been approved for generation by the authoring entity computer 160 and prior to the actual account credential and/or the physical account identification device associated with the new account is activated by the user 110.

According to various embodiments, the transaction processing module 190E may generate a transaction processing advice in connection with a given transaction, and transmit the transaction processing advice to the authorizing entity computer 160, as explained in greater detail below.

Figure 3A:
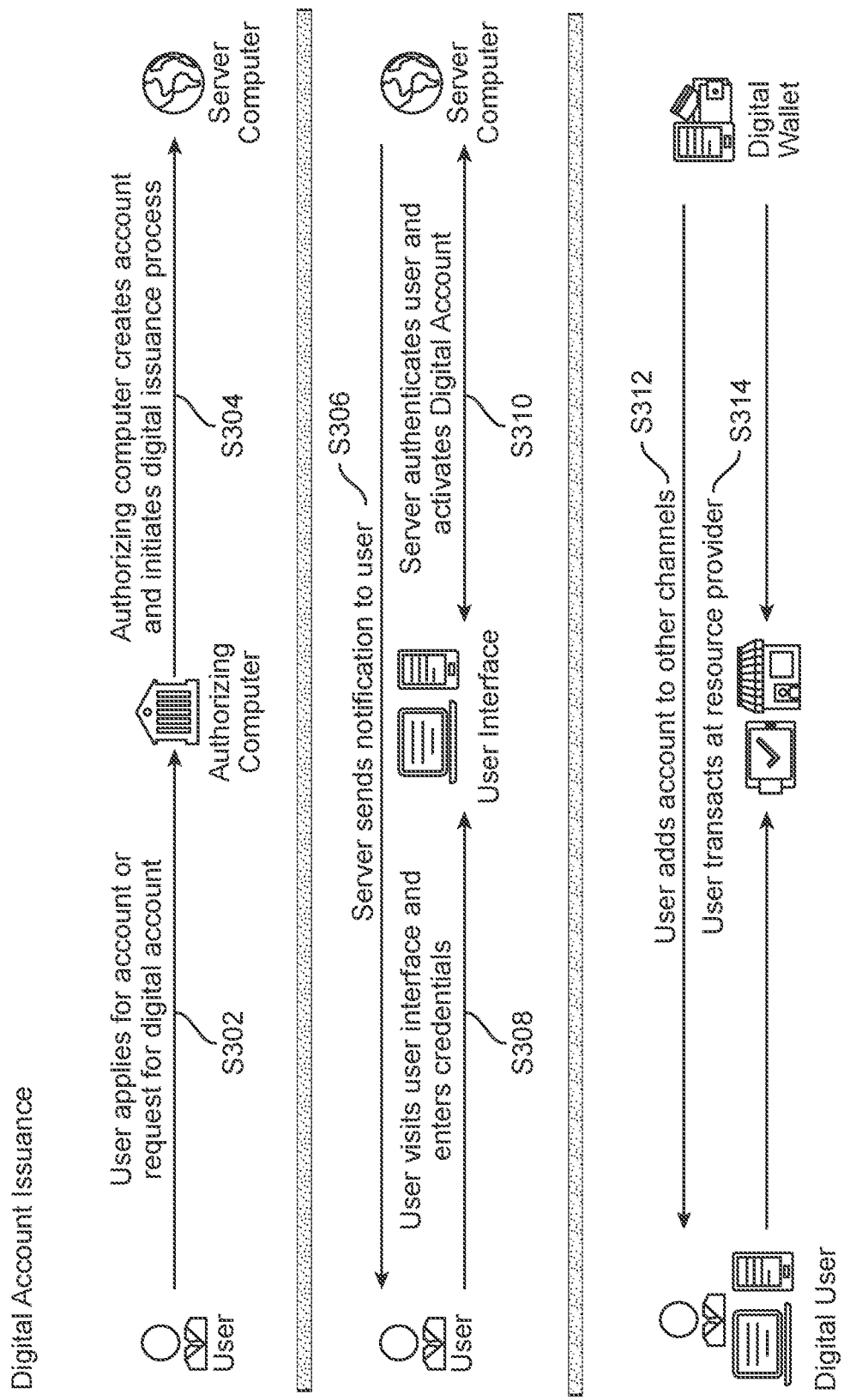
FIG. 3A shows an exemplary flow chart for digital account credential issuance according to an embodiment of the invention.

FIG. 3A illustrates an exemplary flow chart 300 for digital account credential issuance. The user may apply for a new account at an authorizing entity computer (S302). The authorizing entity computer may authenticate user using various methods and create a new account for the user. The authorizing entity computer may then notify the server computer (e.g. digital credential issuing server computer) about the new account and request the server computer to issue digital account credential (e.g. a digital account identifier, a verification value, etc.) for immediate use of the new account (S304). According to various embodiments, the authorizing entity computer may transmit information about the user (e.g. name, address, mobile phone number, set of security questions/answers (for cardholder validation as used by the authorizing entity computer)) to the server computer.

In some embodiments, the account may be a financial account (e.g. a credit account, a debit account, a prepaid account). In case of a credit account, the authorizing entity computer may also transmit to the server computer the credit limit assigned to the new account. In addition, for credit accounts, existing account number prefixes may be used in generation of digital account credentials. In case of a debit account, the authorizing entity computer may transmit to the server computer an initial balance or authorization limit assigned to the user. In addition, for debit accounts, new account number prefixes need to be used to generate the digital account credentials.

In some embodiments, the authorizing entity may limit the use of the account according to a predetermined criteria. The authorizing entity may also share the restrictions imposed on the new account with the server computer. For example, if the account is a financial account, the authorizing entity may not allow a certain type of transactions (e.g. ATM transactions) and may instruct the server computer not to authorize the same type of transactions using the digital account credentials. According to some embodiments, the server computer may limit the allowed usage of the digital account credentials. For example, the server computer may accept or decline transactions based on point-of-entry mode of the transaction such as ATM transactions, electronic commerce transactions, or digital wallet initiated transactions.

Referring back to FIG. 3A, the server computer may generate the digital account credentials and notify the user of the digital account credential issuance (S306). According the some embodiments, the user may then have to authenticate himself/herself to activate the digital account credential. For example, according to optional step S308, the user may visit a user interface provided by the server computer and enter identifying information as required by the server computer. According to step S310, the server computer may then authenticate the user based on the identifying information and activate the digital account credentials. In some embodiments, the user may add the digital account credentials for the new account to other channels such as a digital wallet (optional step S312). At S314, the user may transact using the new account at a resource provider using the digital account credentials without waiting for the authorizing entity computer to issue the actual account credential and/or the physical account identification device for the new account.

Figure 3B:
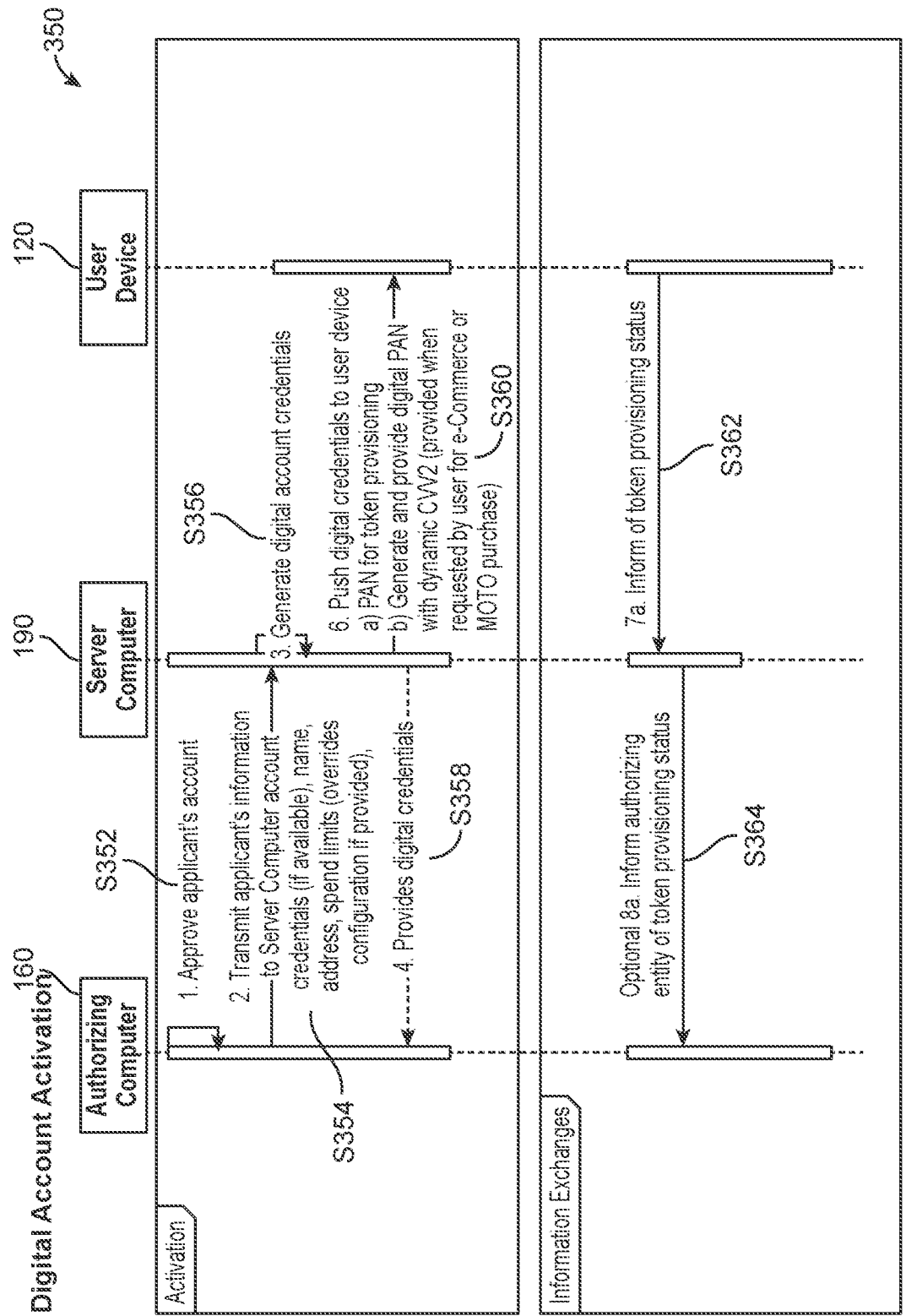
FIG. 3B shows exemplary steps performed by the authorizing entity computer, the server computer and the user device during digital account credential issuance and activation according to embodiments of the invention.

FIG. 3B illustrates steps 350 performed by the authorizing entity computer, the server computer and the user device during digital account credential issuance and activation. The authorizing entity computer 160 may approve the user's request for a new account (S352). The authorizing entity computer may transmit information about the user (e.g. name, address, mobile phone number, set of security questions/answers (for cardholder validation as used by the authorizing entity computer), account restrictions (e.g. spending limits for financial accounts) and, where applicable, actual account credentials to the server computer 190. At S356, the server computer may generate the digital account credentials. At S358, the server computer may transmit the digital account credentials to the authorizing entity. At S360, the server computer transmits (e.g. pushes) the digital account credentials to the user device 120 of the user (e.g. account holder) of the new account. The digital account credentials may include a digital account identifier (e.g. digital PAN), an account validation code (e.g. dynamic CVV2), etc.

In some embodiments, the user may tokenize the digital account credentials using a tokenization server. For tokenized digital accounts, the user device may inform the server provider of the token provisioning status (S362). Upon receipt of tokenization information, the server computer may inform the authorizing entity computer of the token provisioning status (S364).

Once the digital account credentials are provided to the account holder, the account holder may perform transactions using the digital account credentials.

Figure 4A:
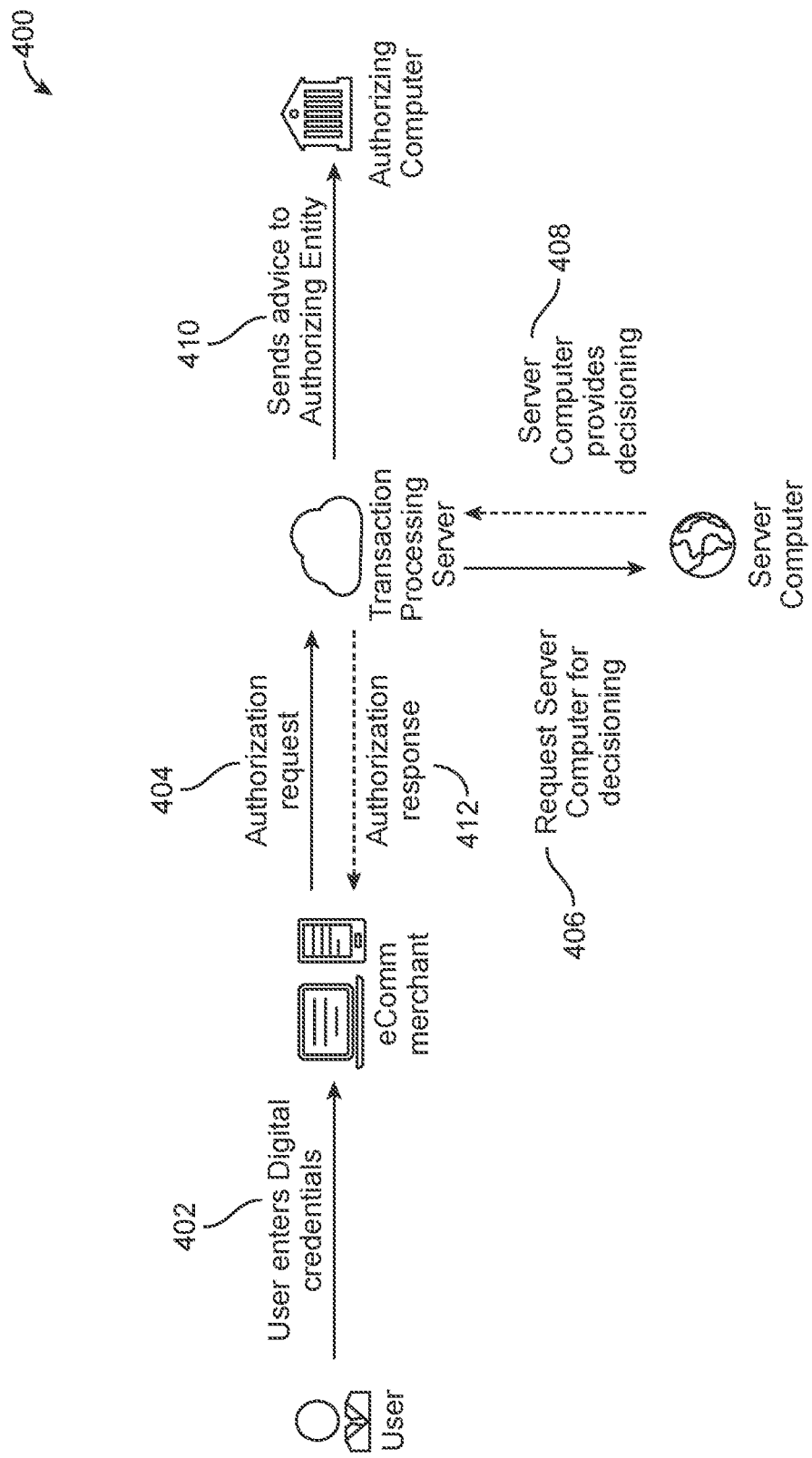
FIG. 4A shows an exemplary flow chart for transaction processing using the digital account credentials according to embodiments of the invention.

FIG. 4A illustrates an exemplary flow chart 400 for transaction processing using the digital account credentials. According to an exemplary embodiment, the new account may be a financial account and the digital account credentials generated by the server computer may include one or more digital account identifiers (e.g. a digital PAN, a dynamic verification code dCVV2, a token representing the digital PAN). At S402, the user may provide the digital account credentials to a resource provider such as an e-commerce merchant or may present the digital account credentials to a resource provider using a digital wallet. In some embodiments, the user may enter the digital account credentials on an appropriate field provided on a website of an online resource provider. The resource provider may generate a transaction authorization request message including the digital account credentials, and may forward the transaction authorization request message to the transaction processing server (S404).

According to various embodiments, the server computer that generates the digital account credentials and processing transaction using the digital account credentials may be separate from the transaction processing server. In some embodiments, the server computer may be managed by the same entity managing the transaction processing server. In other embodiments, the server computer may be managed by a third party entity.

The transaction processing server may forward the transaction authorization request message to the server computer for authorization (S406). The server computer may process the transaction authorization request message, determine whether the transaction is authorized or declined, and transmit the outcome of the decisioning (e.g. whether the transaction is authorized or declined) to the transaction processing server (S408). The transaction processing server then generates and transmits a completion advice to the authorizing entity informing the authorizing entity about whether the transaction is authorized or declined (S410). In some embodiments, the server computer may directly send the completion advice to the authorizing entity informing the authorizing entity about whether the transaction is authorized or declined. The transaction processing server may generate and transmit a transaction authorization response message including the decision of the server computer to the resource provider (S412) to complete the transaction.

Figure 4B:
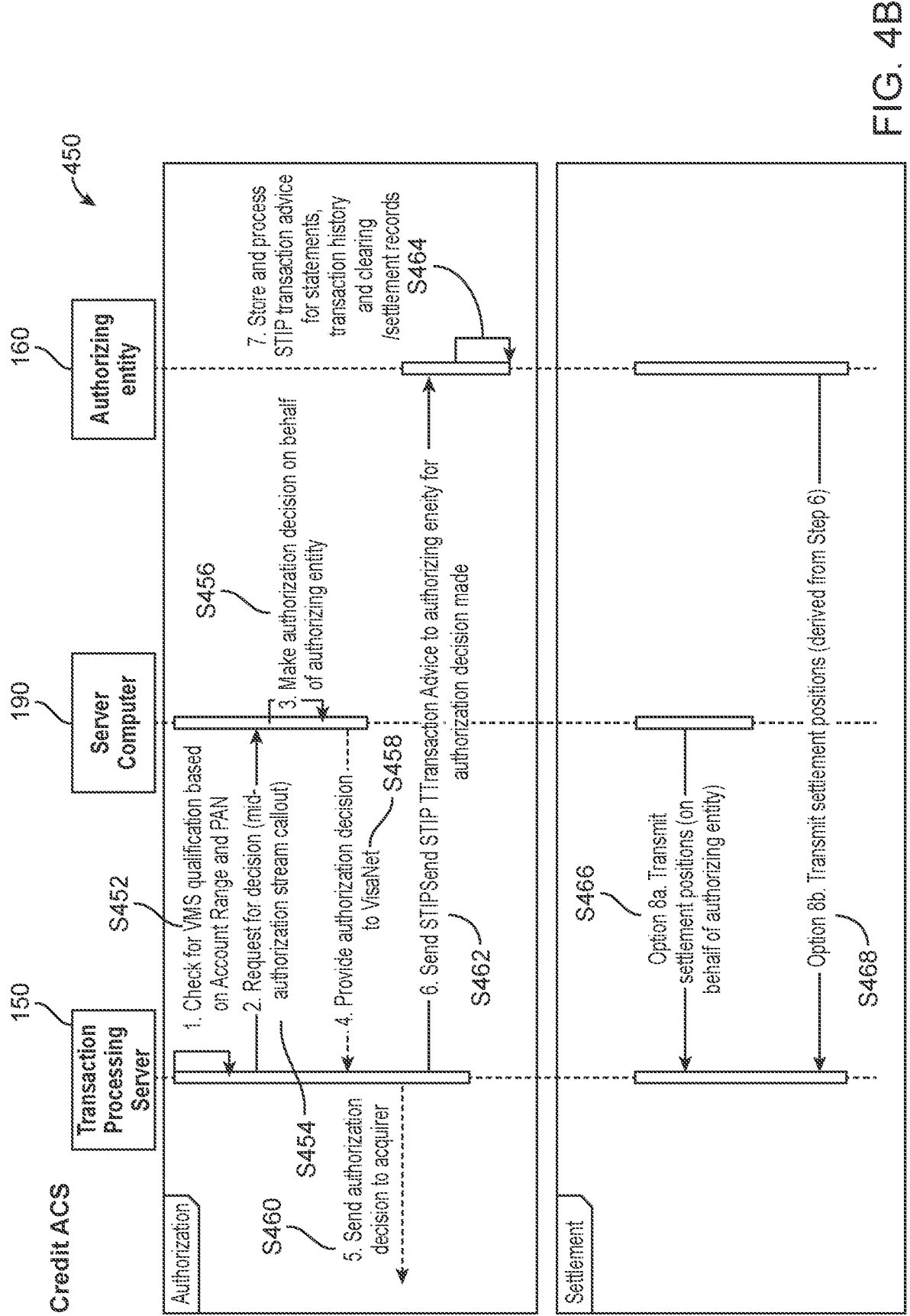
FIG. 4B shows exemplary steps performed by the authorizing entity computer, the server computer and the transaction processing server during transaction processing using the digital account credentials according to embodiments of the invention.

FIG. 4B illustrates steps 450 performed by the authorizing entity computer, the server computer and the transaction processing server during transaction processing using the digital account credentials. According to an exemplary embodiment, the new account may be a financial account and the digital account credentials generated by the server computer may include one or more digital account identifiers (e.g. a digital PAN, a dynamic verification code dCVV2, a token representing the digital PAN). Upon receiving a transaction authorization request, the transaction processing server may check the format of the digital account credentials included in the transaction authorization request message. Upon identifying the digital account credentials, the transaction processing server may determine that the transaction should be processed by the server computer (S452). At S454, the transaction processing server may forward the transaction authorization request message to the server computer for authorization. At S456, the server computer may process the transaction authorization request message, determine whether the transaction is authorized or declined. At S458, the server computer may transmit the authorization decision (e.g. whether the transaction is authorized or declined) to the transaction processing server. The transaction processing server may then send a transaction authorization response message to the transport computer to finalize the transaction. The transaction processing server may also send a transaction advice to the authorizing entity notifying the authorizing entity of the authorization decision (S462). The authorizing entity may store the transaction advice for statements, transaction history and/or clearing and settlement records (S464).

For financial transactions, a clearing and settlement process may also be performed. At S466, the server computer may transmit the settlement report (e.g. settlement positions) to the transaction processing server. Alternatively or in addition to step S466, the authorizing entity may also transmit settlement report (generated based on the received transaction advice(s)) to the transaction processing server at S468.

In some embodiments, the newly generated account may be an account with restrictions. For example, the new account may be a prepaid or debit financial account. In such cases, the server computer may need to inquire about the account status (e.g. current available balance) before determining whether a transaction initiated using the new account may be approved.

Figure 5A:
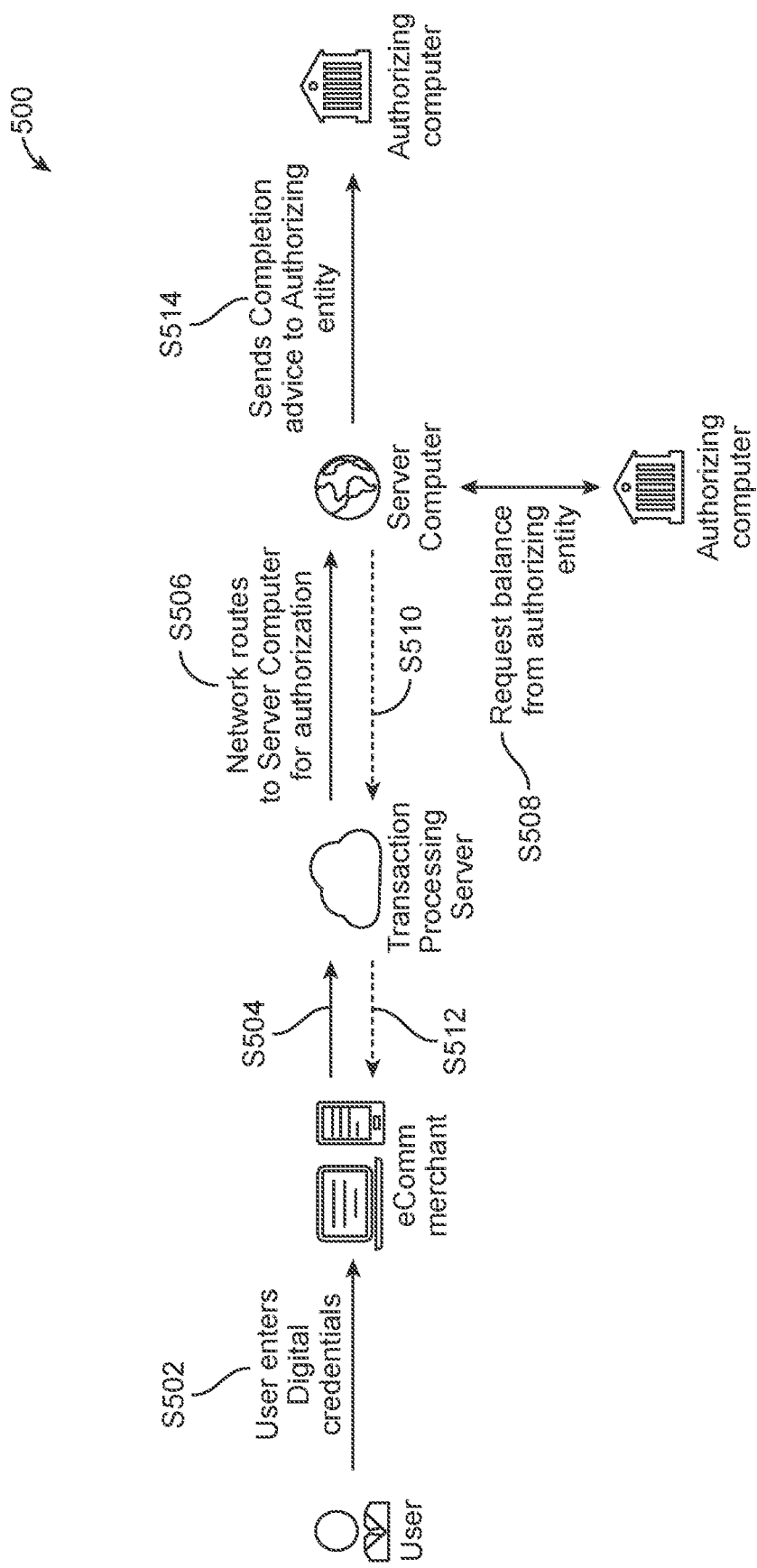
FIG. 5A shows an exemplary flow chart for transaction processing using the digital account credentials for an account with restrictions according to embodiments of the invention.

FIG. 5A illustrates an exemplary flow chart 500 for transaction processing using the digital account credentials for an account with restrictions such as a debit account. At 8502, the user may provide the digital account credentials to a resource provider such as an e-commerce merchant or may present the digital account credentials (e.g. a digital token) to a resource provider using a digital wallet. In some embodiments, the user may enter the digital account credentials on an appropriate field provided on a website of an online resource provider. The resource provider may generate a transaction authorization request message including the digital account credentials, and may transmit the transaction authorization request message to the transaction processing server (S504). The transaction processing server may forward the transaction authorization request message to the server computer for authorization (S506). The server computer may process the transaction authorization request message, determine that the digital account credentials are associated with a debit account. The server computer may contact the authorizing entity computer to inquire about the current balance of the debit account (S508). The authorizing entity computer may return real-time account status information (e.g. balance information) to the server computer via, for example, a dedicated application programing interface (API) hosted by the authorizing entity computer. If the current balance of the debit account is greater than a value of the transaction, the server computer may authorize the transaction. If the current balance of the debit account is less than a value of the transaction, the server computer may decline the transaction. The server computer may transmit the outcome of the decisioning (e.g. whether the transaction is authorized or declined) to the transaction processing server (S510). The transaction processing server may generate and transmit a transaction authorization response message including the decision of the server computer to the resource provider (S512) to complete the transaction. The server computer may generate and transmit a completion advice to the authorizing entity informing the authorizing entity about whether the transaction is authorized or declined (S514).

Figure 5B:
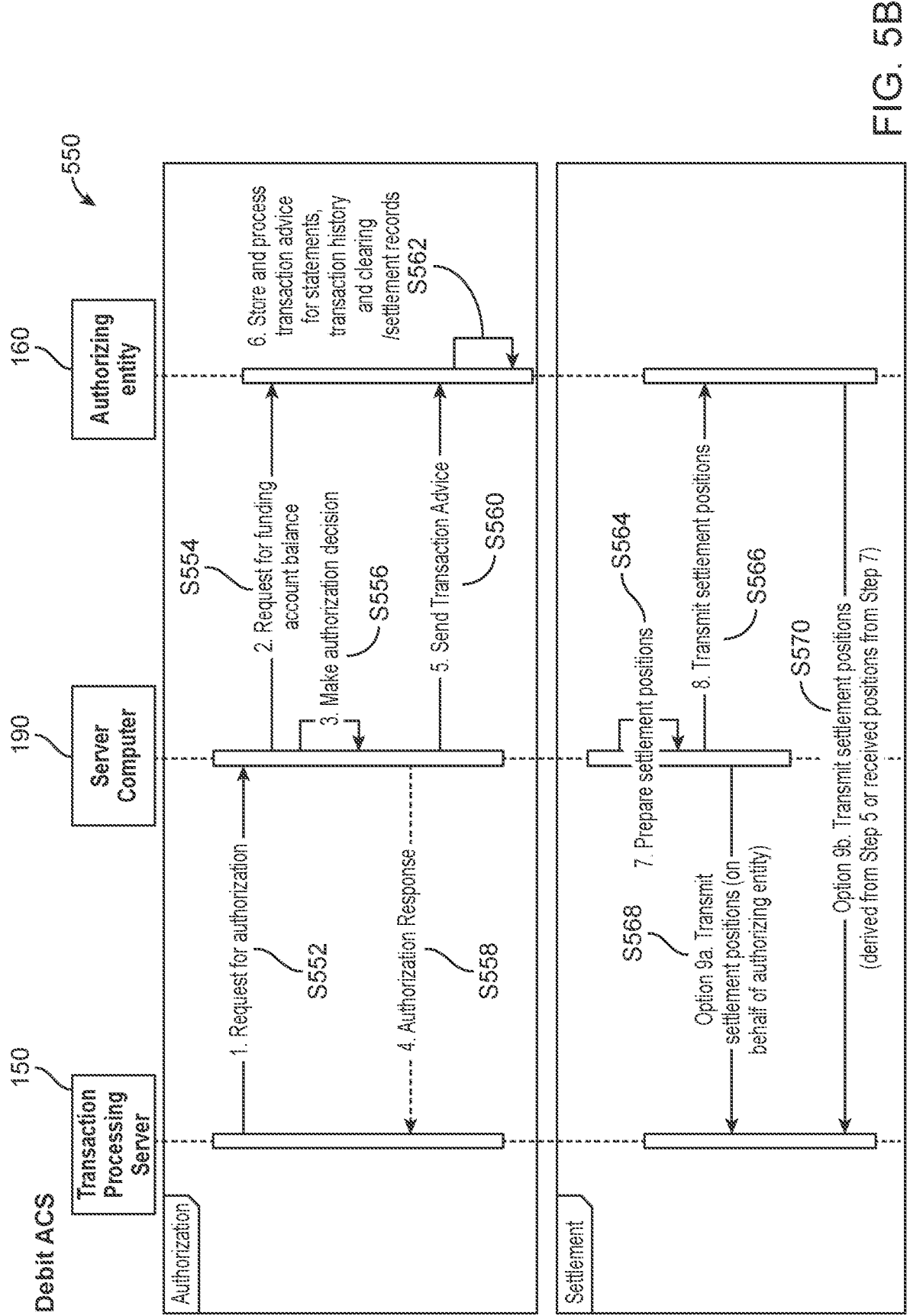
FIG. 5B shows exemplary steps performed by the authorizing entity computer, the server computer and the transaction processing server during transaction processing using the digital account credentials for an account with restrictions according to embodiments of the invention.

FIG. 5B illustrates steps 550 performed by the authorizing entity computer, the server computer and the transaction processing server during transaction processing using the digital account credentials for an account with restrictions such as a debit account. At S552, the transaction processing server may determine that a transaction should be processed by the server computer and transmit a transaction authorization request message (received from a transport computer or a resource provider computer) to the server computer. The server computer may process the transaction authorization request message, determine that the digital account credentials are associated with a debit account. The server computer may contact the authorizing entity computer to inquire about the current balance of the debit account (S554). The authorizing entity computer may return real-time balance information to the server computer via, for example, a dedicated application programing interface (API) hosted by the authorizing entity computer. At S556, the server computer may determine whether the transaction should be authorized or declined based on the real-time balance information received from the authorizing entity. At S558, the server computer may transmit the outcome of the decisioning (e.g. whether the transaction is authorized or declined) to the transaction processing server. The server computer may generate and transmit a completion advice to the authorizing entity informing the authorizing entity about whether the transaction is authorized or declined (S560). The authorizing entity may store the transaction advice for statements, transaction history and/or clearing and settlement records (S562).

For financial transactions, a clearing and settlement process may also be performed. At S564, the server computer may generate a settlement report (e.g. settlement positions). At S566, the server computer may transmit the settlement report to the authorizing entity. In some embodiments, the server computer may also transmit the settlement report to the transaction processing server (S568). Alternatively or in addition to step S568, the authorizing entity may also transmit settlement report (generated based on the received transaction advice(s)) to the transaction processing server at S570.

According to various embodiments, when the necessary procedures are completed, the authorizing entity computer may issue the physical identification device along with the actual account identifier associated with the new account. Upon receipt of the physical identification device, the user may activate the physical identification device along and/or the actual account identifier associated with the new account. This act may automatically deactivate the digital account credentials issued by the server computer for the interim period (e.g. period starting with the new account being approved by the authorizing entity computer and ending with the user activating physical identification device and/or the actual account identifier associated with the new account).

Figure 6A:
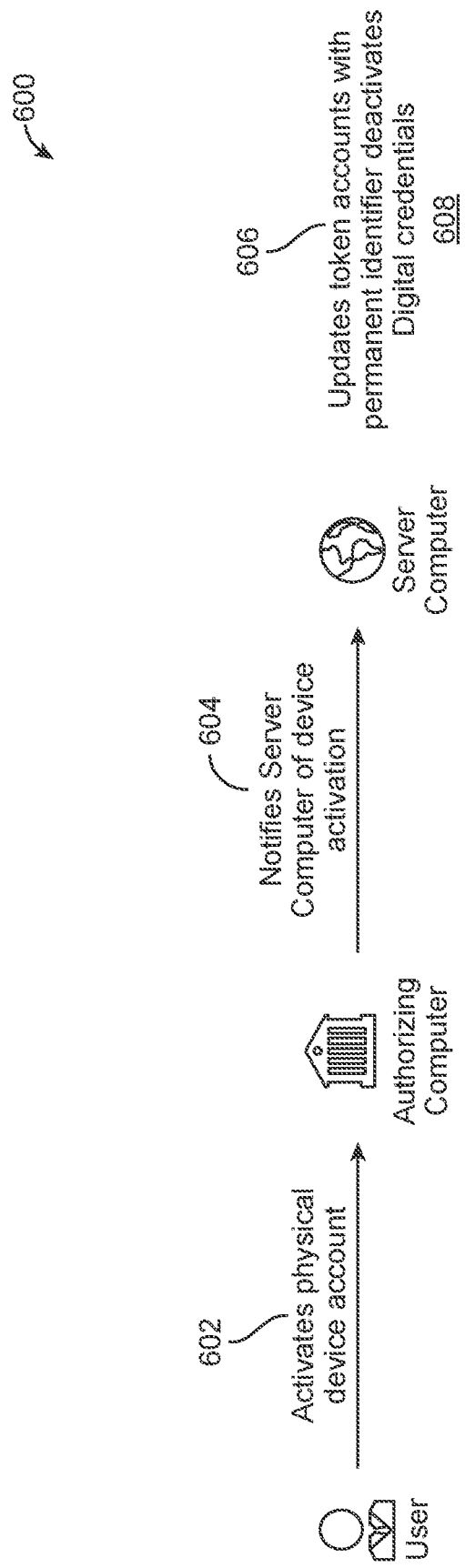
FIG. 6A shows an exemplary flow chart when actual account identifier is activated associated with the physical device account and the associated digital account deactivation and token account update according to embodiments of the invention.

FIG. 6A illustrates an exemplary flow chart 600 to activate the actual account identifier associated with the new account. The user may receive the physical identification device and contact the authorizing entity computer (e.g. via phone, email, visiting an online website, text, etc.) to activate the actual account identifier associated with the new account (S602). The authorizing entity computer may notify the server computer of the device and/or the actual account identifier activation (S604). The server computer then deactivates the digital account credentials (S608). According to some embodiments, if the server computer tokenized the digital account credentials, the server computer may update the token server where the tokens are stored with the permanent actual account identifier (S606).

Figure 6B:
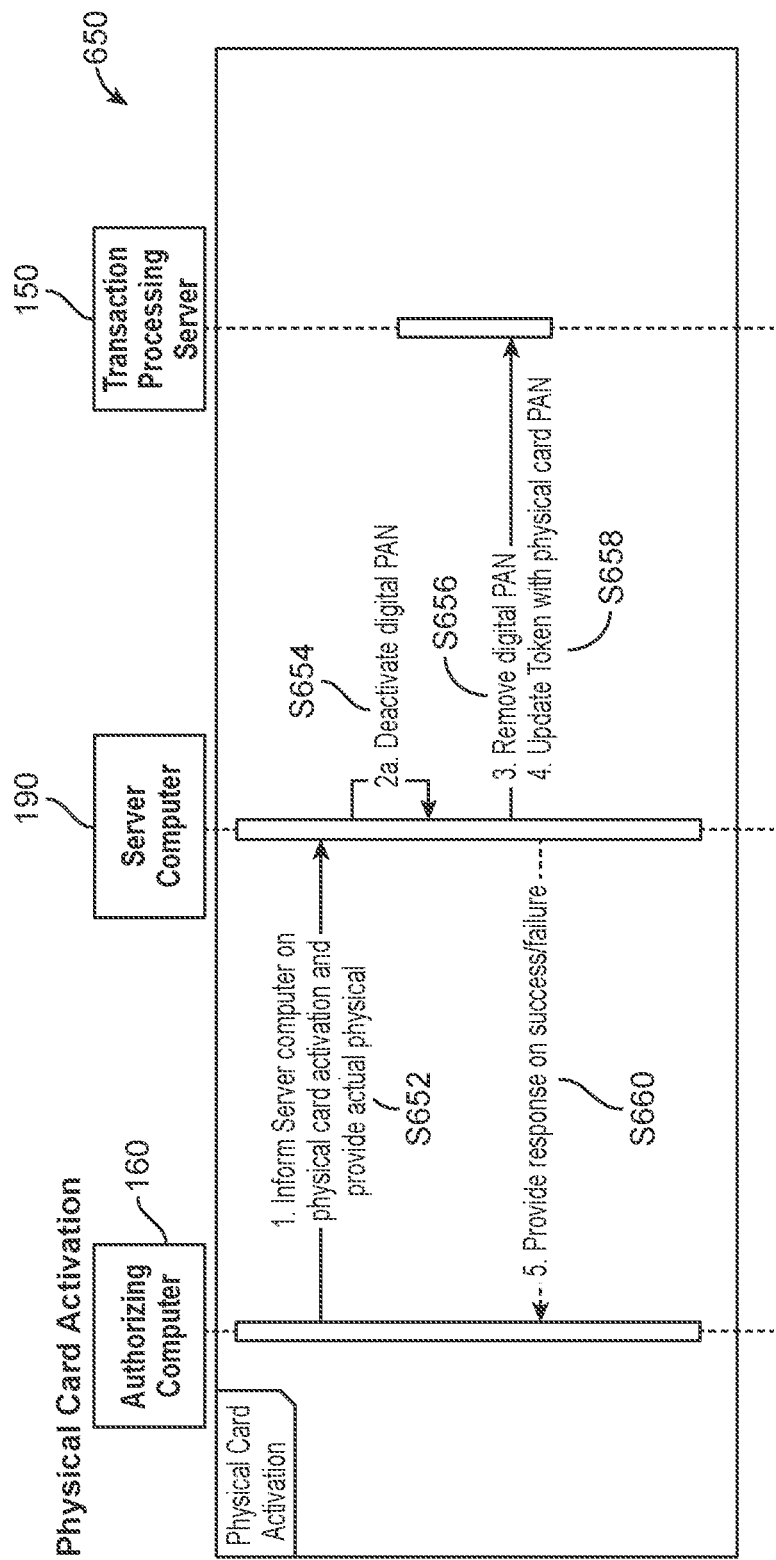
FIG. 6B shows exemplary steps performed by the authorizing entity computer, the server computer and the transaction processing server during activation of the actual account identifier associated with the physical device account and the associated digital account deactivation and token account update according to embodiments of the invention.

FIG. 6B illustrates steps 650 performed by the authorizing entity computer, the server computer and the transaction processing server during activation of the actual account identifier associated with the new account. The user may receive the physical identification device and contact the authorizing entity computer (e.g. via phone, email, visiting an online website, text, etc.) to activate the actual account identifier associated with the new account. Upon receiving the activation request from the user, the authorizing entity computer may inform the server computer of the device and/or the actual account identifier activation (S652). The authorizing entity computer may also transmit the actual account identifier to the server computer. The server computer then deactivates the digital account credentials (S654). The server computer may remove the digital account credentials from databases shared with the transaction processing server and/or instruct the transaction processing server to remove the digital account credentials from storage (S656). According to some embodiments, if the server computer tokenized the digital account credentials, the server computer may update the token server where the tokens are stored with the permanent actual account identifier (S658). Tokens provisioned may then be mapped to the permanent actual account identifier and the user would not need to re-provision the user device with the token. In some embodiments, the server computer may notify the authorizing entity computer of the success/failure of digital account deactivation.

If the user fails to activate the physical identification device and/or the actual account identifier associated with the new account, the server computer may continue to process transactions using the digital account credentials. After a predetermined period, or upon being notified by the authorizing entity computer that the actual account identifier has been issued, the server computer may send periodic reminders to the user to activate the physical identification device and/or the actual account identifier associated with the new account. In some embodiments, in absence of account activation, the server computer may impose restrictions on transactions that can be performed with digital account credentials. For example, in case of financial accounts, the server computer may reduce spending limit of the account (used in connection with the digital account credentials) by a first predetermined amount or percentage after a first predetermined amount of time. The server computer may further reduce the limit by a second predetermined or percentage after a second predetermined amount of time passes in addition to the first predetermined amount of time.

Embodiments of the invention have a number of advantages. As noted above, embodiments of the invention can be used to issue digital account credentials for immediate transacting using a newly issued/generated account. Conventionally, when an authorizing entity issues a new account for a user, the user does not have the ability to conduct transactions using the new account immediately upon issuance. Specifically, the user (i.e. the account holder) needs to first obtain a physical account identifying device and a permanent actual account identifier before being able to use the account. Embodiments provide a server computer that can issue digital account credentials for a newly generated account and process transactions using the digital account credentials during an interim period (e.g. period starting with the new account being approved by the authorizing entity computer and ending with the user activating physical identification device and/or the actual account identifier associated with the new account).

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by a user communication device, authenticating information from a user;
transmitting, by the user communication device, the authenticating information to an authorizing entity computer, wherein a new account is generated by the authorizing entity computer based on the authentication information;
receiving, by the user communication device from a server computer different than and external to the authorizing entity computer, digital credential associated with the new account immediately upon account generation, prior to receiving a physical account identification device associated with the new account, wherein the digital credential is generated by the server computer, wherein the server computer and the authorizing entity computer are managed by different entities;
provisioning, by the user communication device, the digital credential on a digital wallet of the user communication device;
conducting, by the user communication device, one or more transactions using the digital credential during an interim period, wherein conducting a transaction includes:
transmitting, by the user communication device, the digital credential to a resource provider, wherein the transaction is approved by the server computer prior to activation of an actual account credential linked to the physical account identification device associated with the new account;
upon activating the actual account credential:
receiving, by the user communication device, new digital credential associated with the actual account credential;
removing, by the user communication device, the digital credential from the digital wallet, wherein the digital credential is replaced with the new digital credential on the digital wallet; and
conducting, by the user communication device, a subsequent transaction using the new digital after the interim period, wherein conducting the subsequent transaction includes:

transmitting, by the user communication device, the new digital credential to the resource provider, wherein the subsequent transaction is processed by the authorizing entity computer.

2. The method of claim 1, wherein replacing the digital credential with the new digital credential on the digital wallet further comprises:
interacting, by the user communication device, with the authorizing entity computer to provision the new digital credential on the digital wallet.

3. The method of claim 1, wherein the new account is a debit account.

4. The method of claim 1, further comprising:
receiving, by the user communication device, a decline message for a subsequent transaction conducted with the digital credentials after the interim period.

5. The method of claim 1, wherein the digital credential automatically expires upon activation of the actual account credential.

6. The method of claim 1, wherein the digital credential includes one or more of a digital account identifier or an account validation code.

7. The method of claim 1, further comprising:
transmitting, by the user communication device, the digital credential to a tokenization server;
receiving, by the user communication device, a token representing the digital credential from the tokenization server, wherein provisioning the digital credential on the digital wallet comprises:
provisioning the token associated with the digital credential on the digital wallet.

8. The method of claim 7, further comprising:
transmitting, by the user communication device to the server computer, a token provisioning status message indicating that the digital credential is tokenized.

9. A user communication device comprising:
a processor; and
a memory storing non-transitory executable instructions that, when executed by the processor, cause the processor to perform steps comprising:
receiving authenticating information from a user;
transmitting the authenticating information to an authorizing entity computer, wherein a new account is generated by the authorizing entity computer based on the authentication information;
receiving, from a server computer different than the authorizing entity computer, digital credential associated with the new account immediately upon account generation, prior to receiving a physical account identification device associated with the new account, wherein the digital credential is generated by the server computer, wherein the server computer and the authorizing entity computer are managed by different entities;
provisioning the digital credential on a digital wallet of the user communication device;
conducting one or more transactions using the digital credential during an interim period, wherein conducting a transaction includes:
transmitting the digital credential to a resource provider, wherein the transaction is approved by the server computer prior to activation of an actual account credential linked to the physical account identification device associated with the new account;
upon activating the actual account credential:
receiving new digital credential associated with the actual account credential;
removing the digital credential from the digital wallet, wherein the digital credential is replaced with the new digital credential on the digital wallet; and
conducting a subsequent transaction using the new digital after the interim period, wherein conducting the subsequent transaction includes:
transmitting the new digital credential to the resource provider, wherein the subsequent transaction is processed by the authorizing entity computer.

10. The user communication device of claim 9, wherein replacing the digital credential with the new digital credential on the digital wallet further comprises:
interacting with the authorizing entity computer to provision the new digital credential on the digital wallet.

11. The user communication device of claim 9, wherein the new account is a debit account.

12. The user communication device of claim 9, wherein the steps further comprise:
receiving a decline message for a subsequent transaction conducted with the digital credentials after the interim period.

13. The user communication device of claim 9, wherein the digital credential automatically expires upon activation of the actual account credential.

14. The user communication device of claim 9, wherein the digital credential includes one or more of a digital account identifier or an account validation code.

15. The user communication device of claim 9, wherein the steps further comprise:
transmitting the digital credential to a tokenization server;
receiving a token representing the digital credential from the tokenization server, wherein provisioning the digital credential on the digital wallet comprises:
provisioning the token associated with the digital credential on the digital wallet.

16. The user communication device of claim 9, wherein the steps further comprise:
transmitting, to the server computer, a token provisioning status message indicating that the digital credential is tokenized.

* * * * *